TELEGRAPH HUB ELECTRONIC LOOP REPEATER CIRCUIT
Filed Oct. 25, 1949
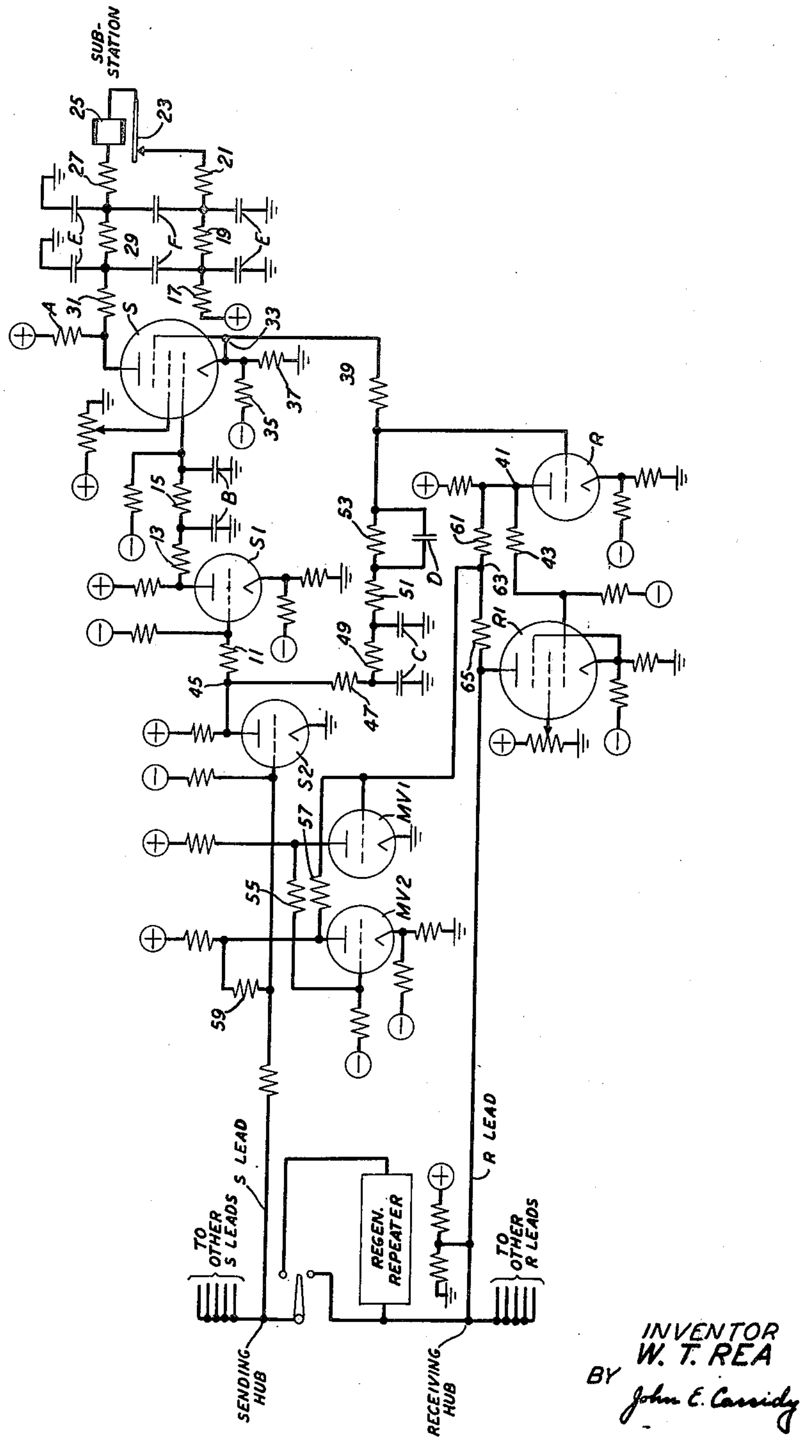
INVENTOR
W. T. REA
BY John E. Cassidy
ATTORNEY Patented Apr. 29, 1952

2,594,993

UNITED STATES PATENT OFFICE 2,594,993

TELEGRAPH HUB ELECTRONIC LOOP REPEATER CIRCUIT

Wilton T. Rea, Manhasset, N. Y., assignor to Bell Telephone Laboratories, Incorporated, New York, N. Y., a corporation of New York Application October 25, 1949, Serial No. 123,366

12 Claims. (Cl. 178—73)

This invention is an improved subscriber loop telegraph repeater of the hub type in which repeater space discharge devices are employed exclusively instead of electromagnetic relays or a combination of electromagnetic relays and space discharge devices as formerly.

Hub type telegraph repeater and subscriber loop hub telegraph repeaters are well known in the art, being described for instance in Patent 2,347,813 issued to G. C. Cummings May 2, 1944.

An object of the present invention is the improvement of telegraph repeaters and more particularly hub type subscriber loop repeaters.

A feature of the invention is a subscriber loop telegraph repeater of the hub type employing space discharge devices to perform all functions.

A number of important advantages are afforded by such a repeater among which are the following: First, it eliminates the necessity for continually adjusting and replacing the contacts of the high speed polar relays ordinarily employed in loop repeaters. Second, the present repeater may be operated faster since there are no moving parts. Third, the present repeater is less expensive in original cost, since the relatively expensive polar relays are eliminated.

Refer now to the drawing which shows a preferred embodiment in which the invention is presently incorporated although it is to be understood that it is capable of other embodiments.

In the drawing a typical hub arranged in a well-known manner for connection with or without a regenerative repeater is shown at the left, the telegraph loop repeater of the present invention is shown in the middle and a subscriber telegraph loop together with a subscriber station circuit is shown at the right. Although the details of only one loop repeater with its subscriber loop and station circuit are shown connected to the hub, it is to be understood that ten or twenty or more, or less, hub repeaters of the hub-to-line type and hub-to-loop type may be interconnected into a single hub repeater concentration through a single hub or pair of hubs. Sending and receiving legs of other such repeaters are indicated by straps connected to the sending hub and the receiving hub. Communication is possible from any one repeater circuit to all of the others simultaneously, but not more than one may transmit signals to all of the others simultaneously. In such an arrangement a break feature is necessary and it is afforded by the present repeater.

The loop repeater comprises essentially three space discharge devices S2, S1 and S in the sending leg, through which signals are transmitted from the hub toward the subscriber loop, two space discharge devices R and R1 in the receiving leg through which signals are transmitted from the subscriber loop to the hub, two space discharge devices MV1 and MV2, connected between the sending and receiving legs, which aid in controlling transmission in the two legs at different times and another resistance capicitance connection between the two legs which aids in performing the same function.

One of the space discharge devices in the sending leg, pentode S, has its output circuit in series with the subscriber loop and is subject to control by its input circuit the grid of which is connected in the sending leg, as well as to control by telegraph transmitting contacts connected at the subscriber station in series with the subscriber loop which is in series with the anode-cathode circuit of pentode S. The cathode circuit of pentode S is connected to the grid of receiving triode R in the receiving leg. So pentode S may be considered to be in the loop as well as in both the sending and receiving legs. The sending lead, or sending leg as it is generally known, is connected to the sending hub. The receiving lead or receiving leg is connected to the receiving hub. Depending upon whether a regenerative repeater is or is not required the two hubs may be joined by the operation of switch SW either through a regenerative repeater or directly. In the latter case there is a single hub which, electrically, is a point to which all sending legs and all receiving legs of all hub repeaters in the hub concentration group are joined. It will be assumed that the switch SW is operated in a manner to connect the regenerative repeater into the hub.

*Normal condition*

During the normal marking condition positive potential is supplied to both the S lead and the R lead at the sending and receiving hubs. Triode S2 in the sending lead is conducting. This lowers the potential of its anode which lowered potential is applied through resistance 11 to the grid of triode S1 which is thereby held non-conducting. This in turn results in the impressing of a relatively higher positive potential through resistances 13 and 15 on the grid of pentode S, activating the pentode and causing current to flow from positive battery through the bottom loop conductor, the distributed resistance of which is simulated by resistances 17, 19 and 21, through transmitting contacts, such as teletypewriter transmitting contacts 23, telegraph receiver 25, which may for instance be a magnet of a teletypewriter receiver, the top loop conductor, the distributed resistance of which is simulated by resistances 27, 29 and 31, to the anode of pentode S, through the space between the anode and cathode of pentode S to the junction 33 of the cathode potentiometer formed by resistances 35 and 37, the outer terminals of which are connected between negative battery and ground. The potentiometer junction 33 is connected through resistance 39 to the grid of receiving triode R. The current flowing in the cathode potentiometer 35, 37 of pentode S due to this condition makes the potential applied between junction 33 and the grid of receiving triode R, through resistance 39, positive with respect to the cathode of triode R and triode R conducts. This makes the potential applied from junction 41 through resistance 43 on the grid of pentode R1 negative with respect to its cathode and pentode R1 is cut off.

*Transmission of spacing signal toward loop*

A spacing signal transmitted through the hub from some other repeater assumed to be transmitting toward the hub makes the hub negative and this negative potential is impressed through each S lead of each repeater in the hub concentration including the S lead shown in the hub loop repeater of the drawing. This cuts off triode S2, in turn activating triode S1. The resulting negative swing at the anode of triode S1, after being shaped by condensers B, cuts off pentode S and stops the flow of current in the loop. The deenergization of receiving magnet 25 results in the reception of a spacing signal at the subscriber station.

The cessation of current in the cathode potentiometer circuit of pentode S makes junction 33 more negative and tends to swing the grid of triode R negative, but this tendency is just balanced by the application of the positive potential condition of the anode of triode S2, which as explained is in the cut-off condition, from junction 45 through resistances 47, 49, 51 and 53 on the grid of receiving triode R. Condensers C connected to ground between the junctions of resistances 47 and 49 and 49 and 51 are provided to shape the wave applied to the grid of triode R in the same manner as condensers B shape the swing applied to this grid from the cathode potentiometer of pentode S. In this shaping process condenser D acts to simulate the effect of the capacitance of the subscriber loop which is composed of the distributed capacitance to ground of each conductor, simulated by condensers E, and the distributed interconductor capacitance simulated by condensers F. Thus the grid of triode R is acted upon by two equal and opposite effects and the spacing signal being transmitted from the hub through the sending leg to the loop is not transmitted back through the receiving leg to the hub.

The purpose of shaping the wave applied to the grid of pentode S, which is accomplished by condensers B, is to minimize interference between the loop conductors and other conductors in the same cable, via the distributed capacitance between conductors.

Resistor A which is shunted from the plate of pentode S to positive battery, serves to prevent the signals transmitted to the loop from being affected by positive bias. The dynamic plate resistance of pentode S is so much greater than the value of resistor A that practically a constant resistance is presented to the loop for both marking and spacing conditions. Any residual bias which may result from the fact that said dynamic resistance is not infinitely great may be compensated by the asymmetrical charging and discharging of condensers B which result from the variation in the dynamic resistance of the plate circuit of triode S1.

*Spacing signal from loop*

It will now be assumed that the subscriber opens transmitting contacts 23 to transmit a spacing signal toward the hub. As a result of this, current flow through pentode S and its cathode potentiometer ceases, making terminal 33 negative. The sending hub at this instant is positive, due to the delay on transition between signal elements so that triode S2 is conducting. The potential of junction 45 is at its lower value and when applied through resistances 47, 49, 51 and 53 on the grid of triode R is not effective, as formerly, to balance the negative swing from terminal 33. Receiving triode R is therefore cut off, in turn activating receiving pentode R1, as a result of the positive swing of the anode of triode R, which is applied from junction 41 through resistance 43 on the grid of pentode R1. As a result of this, current flows in the R lead and a spacing signal is sent to the receiving hub.

*Control circuit duplex feature*

The locking feature in the control circuit is performed by triodes MV1 and MV2 which are interconnected to form a flip-flop circuit. Triode MV1 is controlled jointly by the anode potentials of triode R and pentode R1. In response to the spacing signal transmitted from contacts 23 as explained, the anode of triode R swings positive and that of pentode R1 swings negative. The anodes of triode R and of pentode R1 are interconnected through resistances 61 and 65 from junction 63 of which a connection is made to the grid of triode MV1. For this condition junction 63 and the grid of triode MV1 swing positive, activating triode MV1, the anode of which applies a negative swing through resistance 55 to the grid of triode MV2, deactivating triode MV2, causing a positive swing of the anode of triode MV2 which is applied through resistance 59 to the grid of triode S2 in the sending lead incoming from the sending hub. Triode S2 is therefore held activated.

Due to the delay introduced by the regenerative repeater connected between the receiving and sending portions of the hub, the spacing signal will not reach the sending lead for an interval approximately equal in duration to the duration of one-half a signal element. When the S lead goes negative in response to the spacing signal, after this interval, it will be ineffective as the positive swing from the anode of triode MV2 through resistance 59 on the grid of triode S2 will be dominant, maintaining triode S2 activated and preventing the spacing signal, generated at the subscriber station shown, by the opening of contacts 23, from being propagated back toward the same subscriber station.

When the anode of triode MV2 swings positive, the positive swing is applied through resistance 57 on the grid of triode MV1 to maintain triode MV1 activated. When contacts 23 are reclosed to transmit a marking signal, triode R conducts and pentode R1 is cut off. Terminal 63 swings negative, but its effect on the grid of triode MV1 is dominated by the positive swing applied from the anode of inactivated triode MV2 through resistance 57 so that the locking condition applied to triode S2 will be maintained as long as signals are being transmitted from contacts 23 at the subscriber station shown in the drawing.

When transmission from contacts 23 of the subscriber station shown in the drawing is ended, the subscriber station resumes the marking condition. Pentode R1, as has been described is non-conducting and no current flows in the R lead. Triode MV1 conducts while triode MV2 is cut off, applying a positive potential to triode S2 for the locking condition. If now some other repeater connected into the hub concentration transmits a spacing signal over its respective R lead to the receiving hub, the R lead of the hub loop repeater shown in the drawing, which it is assumed last transmitted toward the hub, becomes more negative. This applies a negative swing through resistance 65 from junction 63 on the grid of triode MV1. This potential is sufficiently negative to overcome the positive locking potential which is being applied from the anode of the associated triode MV2 so that triode MV1 is cut off, triode MV2 conducts and a lowered potential is applied through resistance 59. This lowered potential will be sufficient to release the hold formerly applied to triode S2 which will then be free to follow signals as soon as they arrive on the sending hub and are transmitted through the S lead.

It is particularly pointed out that it will be necessary to release the hold only in the repeater which last transmitted toward the hub as the sending legs of all other repeaters which are intended to receive signals will be in the normal unlocked condition and the hub loop repeaters will respond as described for a spacing signal transmitted toward the loop. The S leg of the repeater which it is assumed has begun to transmit will be locked in the manner previously described.

*Break feature*

For a break signal any one of the repeaters connected into a hub concentration transmits a long spacing signal toward the hub. If the subscriber station shown in the drawing, for instance, is at this instant transmitting a marking signal element toward the hub, the long space or break signal incoming from the hub will be received at the subscriber station shown in the drawing as well as at all stations connected to the hub concentration in the same manner as described in the foregoing for a spacing signal toward the loop. It will be observed that under this condition the flow of current in the subscriber loop ceases and this condition persists as long as the long incoming space or break signal may be maintained. Operation of contacts 23 at the subscriber station is without effect as there is no current in the loop to be interrupted and the subscriber at the station illustrated in the drawing, who is assumed to be transmitting, loses control of his pentode S while his receiving magnet 25 remains deenergized as an indication of the break. As explained also while the space is incoming the triode R is maintained in the conducting condition and a marking signal is applied to the receiving hub from the R lead.

As is usual it is not possible to break against a break. If the contacts 23 at the subscriber station illustrated, for instance, are opened to transmit a break signal and if while this condition exists some other repeater connected into the hub concentration attempts to transmit a long spacing signal as a break indication, as a result of the simultaneous presence of two break signals on the receiving hub the anode of pentode R1 will become more negative. This, however, is not effective to remove the hold which is being applied, by means of triodes MV1 and MV2, since triode R is activated for a space, as explained, and the positive potential of its anode applied through resistance 61 and junction 63 to the grid of triode MV1 is dominant also over the increased negative potential applied through resistance 65 to the grid of triode MV1 for the double space condition. Triode MV1 remains activated, triode MV2 remains inactivated, and the positive swing applied from its anode through resistance 59 holds triode S2 in the activated condition which maintains the sending branch toward the subscriber loop in the marking condition, so that, notwithstanding the spacing signal impressed on the S hub and S lead, it is without effect against a spacing signal outgoing from the subscriber station and particularly is not effective to change the outgoing space to marking.

What is claimed is:

1. In a hub type telegraph repeater concentration, a loop and telegraph station circuit connected to a hub type loop telegraph repeater, said repeater having a first space discharge device in a sending leg to receive signals incoming from the hub to the loop, a second space discharge device responsive to said first device, said second device having an anode-cathode path in series with said loop, a third space discharge device in a receiving leg, said third device having a first control circuit connected to said first device and a second control circuit connected to said second device, so as to control said third device in a plurality of manners dependent on the activation or inactivation of said first and second devices.

2. A direct-current hub type telegraph repeater system having a hub, a direct-current hub loop type telegraph repeater, a loop connected to said repeater, a sending leg and a receiving leg in said loop repeater, each of said legs directly connected to said hub, a space discharge device having an input circuit in said sending leg and an output circuit in series with said loop, a space discharge device in said receiving leg and a control connection from said output circuit to the input of said space discharge device in said receiving leg.

3. A direct-current hub type loop telegraph repeater, a hub, a telegraph loop connected to said repeater, a first space discharge device in said loop repeater, said device having an output circuit through which current flows and is cut off in response to a first and a second signal condition, respectively, produced in said loop, a sending leg and a receiving leg in said loop repeater both connected directly to said hub, a second space discharge device in said sending leg, said second device having an output circuit connected to an input circuit of said first device, a third space discharge device in said receiving leg, said third device having an input cricuit connected to said output circuit of said first device.

4. A repeater in accordance with claim 3 and an electric discharge hold circuit interconnecting said legs to impose a hold on one of said legs in response to a condition imposed on the other of said legs.

5. A direct-current hub telegraph repeater system having a hub, a direct-current hub type loop telegraph repeater connected to said hub, a telegraph loop and station circuit connected to said loop repeater, a first space discharge device having an output circuit connected in said loop, a sending leg extending from said hub directly to the input of said device, a receiving leg extending from the output of said device directly to said hub.

6. A system in accordance with claim 5 in which said sending leg has a second space discharge device, intermediate said hub and said input, an output circuit for said second device, said receiving leg having a third space discharge device intermediate said output of said first device and said hub, an input circuit for said third device, said input circuit having a first and a second control connected to and responsive to said outputs of said first and said second devices.

7. A hub type loop telegraph repeater, a hub, said repeater connected on a first side to a telegraph loop and on a second side through a sending leg and a receiving leg in said repeater, to said hub, a first, second and third space discharge device in said sending leg, a fourth and fifth space discharge device in said receiving leg, a sixth and seventh space discharge device interconnecting said legs, an input and an output circuit for each of said devices, the input of said first connected to said hub, the output of said first connected to the input of said second, the output of said second connected to the input of said third, the output of said third in series with said loop and connected to the input of said fourth, the output of said fourth connected to the input of said fifth, the output of said fifth connected to said hub, said outputs of said fourth and fifth connected together and to the input of said sixth, the output of said sixth connected to the input of said seventh, the output of said seventh connected to the input of said first, the outputs and inputs of said sixth and seventh interconnected to form a flip-flop circuit.

8. A direct-current hub telegraph repeater system having a hub, a direct-current hub type loop telegraph repeater having a sending leg and a receiving leg connected directly to said hub, a telegraph loop and telegraph station circuit connected to said loop repeater, a first set of space discharge devices in said sending leg, a second set of space discharge devices in said receiving leg, and a third set of space discharge devices interconnected between said legs, control connections between said space discharge devices in said sending leg and said space discharge devices in said receiving leg and other control connections between said space discharge devices in said receiving leg and said space discharge devices interconnected between said legs to regulate communication between said station and said hub.

9. A direct-current hub type telegraph repeater concentration having a direct-current hub type loop repeater, a telegraph loop and station circuit connected to said loop repeater, a sending leg and a receiving leg in said repeater directly connected to said hub, a space discharge device, an input circuit, an output circuit and a cathode circuit for said device, said sending leg connected to said input to control said input circuit, said loop and station circuit connected to said output circuit to control said output circuit, said cathode circuit connected to said receiving leg to control said receiving leg.

10. A direct-current hub type telegraph system having a hub, a direct-current hub type loop telegraph repeater connected to said hub, a loop and station circuit connected to said repeater, a sending leg and a receiving leg in said repeater directly connected to said hub, a plurality of space discharge devices in each of said sending and receiving legs, a space discharge control circuit interconnecting said legs, a clean break feature in said repeater, said feature comprising instrumentalities in said control circuit for preventing the retransmission of signals incoming through said sending leg back through said receiving leg in inverted form while a break condition is being transmitted from said station circuit.

11. A direct-current hub telegraph repeater system having a hub, a loop type direct-current hub repeater connected to said hub, a loop and station circuit connected to said repeater, a sending leg, a space discharge device therein, a receiving leg, a space discharge device therein, said legs connected directly to said hub, a control circuit interconnecting said legs, a space discharge device in said control circuit, and interconnections between said devices and said-control circuit for preventing the retransmission of signals incoming through said sending leg back through said receiving leg.

12. In a hub telegraph repeater system, a hub, a loop type hub repeater connected to said hub, a loop and station circuit connected to said repeater, a sending leg, a first and a second space discharge device in said sending leg, a receiving leg, a third space discharge device in said receiving leg, a first connection from the output circuit of said second device to the input circuit of said third device to activate said third device in response to signals generated in said station circuit and a second connection from the output circuit of said first device to the input circuit of said third device to prevent the activation of said third device in response to signals incoming through said sending leg.

WILTON T. REA.

REFERENCES CITED

The following references are of record in the file of this patent:

UNITED STATES PATENTS

| Number | Name | Date |
|---|---|---|
| 1,852,050 | Hamilton | Apr. 4, 1932 |
| 2,273,193 | Heising | Feb. 17, 1942 |
| 2,503,000 | Shanck | Apr. 4, 1950 |